(12) United States Patent
Kim et al.

(10) Patent No.: US 9,182,541 B2
(45) Date of Patent: Nov. 10, 2015

(54) GRAPHENE PHOTONIC DEVICE

(71) Applicant: Electronics and Telecommunications Research Institute, Daejeon (KR)

(72) Inventors: Jin Tae Kim, Daejeon (KR); Choon Gi Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 311 days.

(21) Appl. No.: 13/794,582

(22) Filed: Mar. 11, 2013

(65) Prior Publication Data

US 2014/0105553 A1 Apr. 17, 2014

(30) Foreign Application Priority Data

Oct. 17, 2012 (KR) .................... 10-2012-0115436

(51) Int. Cl.
*G02B 6/02* (2006.01)
*G02F 1/01* (2006.01)

(52) U.S. Cl.
CPC *G02B 6/02* (2013.01); *G02F 1/011* (2013.01); *G02F 1/0136* (2013.01); *G02F 2203/10* (2013.01)

(58) Field of Classification Search
None
See application file for complete search history.

(56) References Cited

U.S. PATENT DOCUMENTS

| 4,697,868 | A | 10/1987 | Thanivavarn |
| 5,835,644 | A | 11/1998 | Oh et al. |
| 6,442,321 | B1 | 8/2002 | Berini |
| 6,902,871 | B2 | 6/2005 | Dinu et al. |
| 7,294,292 | B2 | 11/2007 | Akutsu et al. |
| 2009/0190876 | A1 | 7/2009 | Doi |
| 2011/0227043 | A1 | 9/2011 | Guo et al. |
| 2013/0101247 | A1* | 4/2013 | Cho et al. ............... 385/1 |
| 2014/0023321 | A1* | 1/2014 | Lu et al. ............... 385/40 |

OTHER PUBLICATIONS

Ming Liu et al., "A graphene-based broadband optical modulator", Nature, Jun. 2, 2011, pp. 64-67, vol. 474, Macmillan Publishers Limited.
Steven J. Koester et al., "High-speed waveguide-coupled graphene-on-graphene optical modulators", Applied Physics Letters 100, 2012, pp. 171107-1 ~ 171107-4.

* cited by examiner

*Primary Examiner* — Tina Wong

(57) ABSTRACT

Provided is a graphene optical device. The optical device includes a lower clad, an optical waveguide extended on the lower clad in a first direction, a first dielectric layer disposed on the optical waveguide, and a graphene layer extended on the first dielectric layer in a second direction.

6 Claims, 6 Drawing Sheets

GRAPHENE PHOTONIC DEVICE

CROSS-REFERENCE TO RELATED APPLICATIONS

This U.S. non-provisional patent application claims priority under 35 U.S.C. §119 of Korean Patent Application No. 10-2012-0115436, filed on Oct. 17, 2012, the entire contents of which are hereby incorporated by reference.

BACKGROUND OF THE INVENTION

The inventive concept disclosed herein relates a photonic device, and more particularly, to a graphene photonic device.

A planar lightwave circuit (PLC) technology is a technology of implementing an optical waveguide, an optical communication medium on a planar substrate such as a silicon wafer and manufacturing an optical device.

A general optical waveguide type of an optical device is formed from quadrilateral or circular core dielectric with a high refractive index and clad dielectric with a low refractive index. Light may be transmitted through the core dielectric. An optical waveguide may change the intensity, polarization, or phase by the change in refractive index.

SUMMARY OF THE INVENTION

The inventive concept provides a graphene photonic device implementing an optical modulator by using a graphene layer.

The inventive concept also provides a graphene photonic device capable of implementing a polarization controller.

The inventive concept also provides a graphene photonic device capable of more efficiently inducing the property of an optical signal traveling through an optical waveguide device of a metallic-line optical waveguide.

Embodiments of the inventive concept provide graphene photonic devices including a lower clad; an optical waveguide extended on the lower clad in a first direction; a first dielectric on the optical waveguide; and a graphene layer on the first dielectric layer.

In some embodiments, the device may further include a second dielectric layer on the graphene layer; and an electrode layer on the second dielectric layer.

In other embodiments, the first dielectric layer and the second dielectric layer may include silica polymer whose refractive index changes by heat or an electric field.

In still other embodiments, the optical waveguide may have a higher refractive index than a substrate and the first dielectric layer. The optical waveguide may include a metallic-line optical waveguide. The metallic-line optical waveguide may have a thickness of about 5 nm to 200 nm and a line width of about 2 µm to 100 µm.

In even other embodiments, the optical waveguide may include polymer, oxide silicon, or nitride silicon.

In yet other embodiments, the first dielectric layer may include graphene oxide.

In further embodiments, the device may further include an upper clad covering the graphene layer. The lower clad and the upper clad may include polymer, a silicon oxide film, quartz, or silicon.

In still further embodiments, the graphene layer may be extended in a second direction intersecting with the first direction.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF PREFERRED EMBODIMENTS

Figure 1:
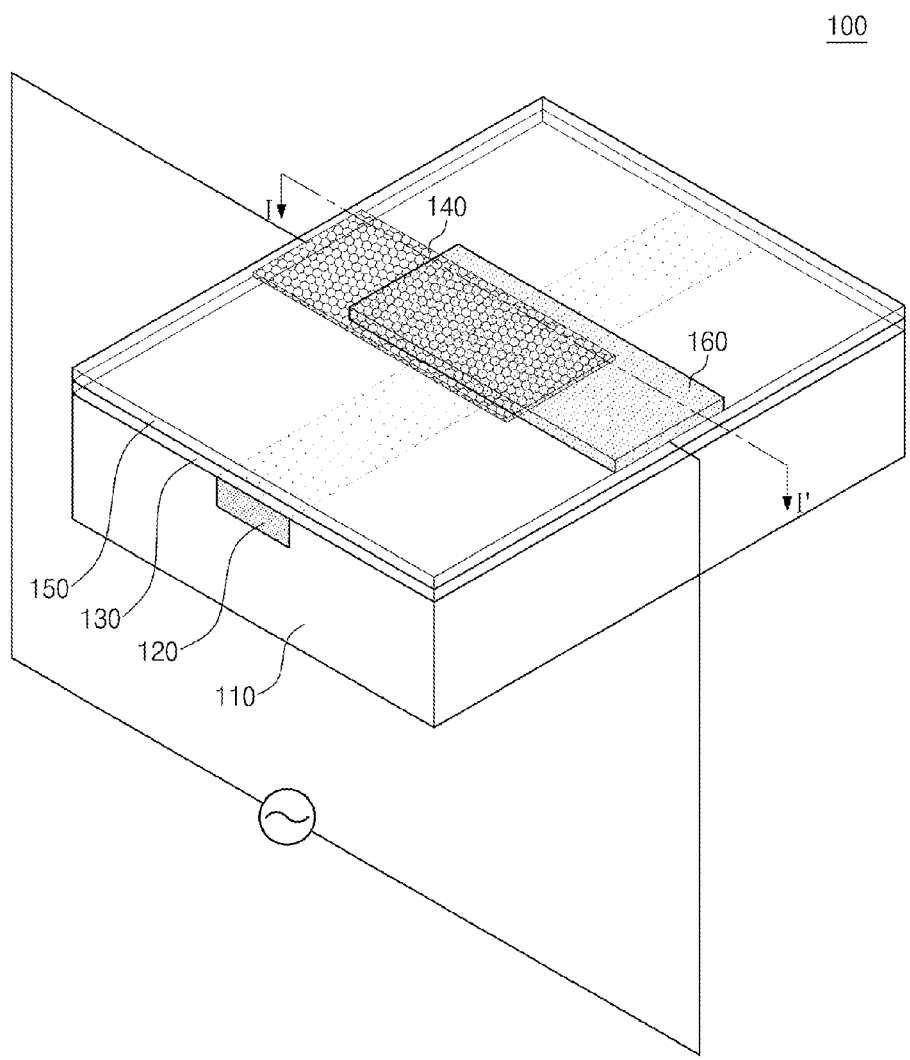
FIG. 1 is a perspective view representing a graphene photonic device according to a first embodiment of the inventive concept.

Embodiments of the inventive concept will be described in detail below with reference to the accompanying drawings so that those skilled in the art to which the inventive concept pertains can easily practice the inventive concept. The inventive concept may, however, be embodied in different forms and is not limited to the embodiments set forth herein.

In addition, parts in the drawings that do not have a relation to the description are not described to make the inventive concept clear, and like reference numerals are attached to like parts throughout the specification.

Throughout the specification and claims, when it is described that one comprises (or includes or has) some elements, it should be understood that it may comprise (or include or has) only those elements, or it may comprise (or include or have) other elements as well as those elements if there is no specific limitation.

It will be understood that when parts, such as a layer, a film, a plate are referred to as being 'on' another part, it can be directly on another part, or intervening layers may also be present. On the contrary, when some part is referred to as being 'directly on' another part, it means that no intervening part is present.

Figure 2:
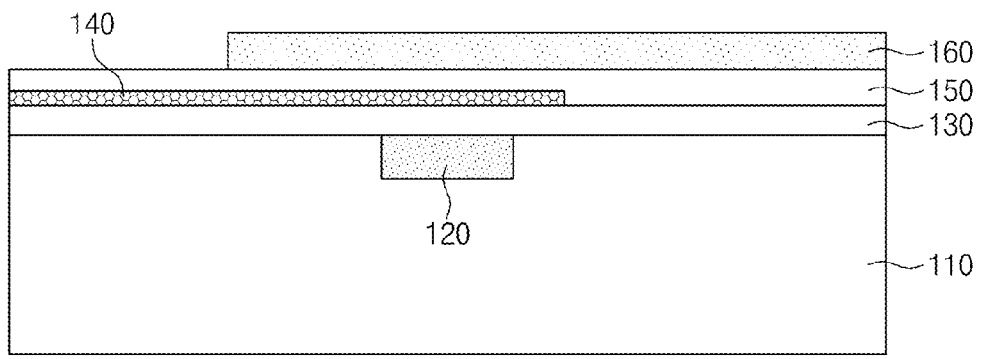
FIG. 2 is a cross sectional view taken along line I-I' of FIG. 1.

FIG. 1 is a perspective view representing a graphene photonic device 100 according to a first embodiment of the inventive concept. FIG. 2 is a cross sectional view taken along line I-I' of FIG. 1.

Referring to FIGS. 1 and 2, the graphene photonic device 100 according to the first embodiment of the inventive concept may include a lower clad 110, an optical waveguide 120, a first dielectric layer 130, a graphene layer 140, a second dielectric layer 150, and an electrode 160.

The lower clad may have a lower refractive index than the optical waveguide 120. The lower clad 110 may include a substrate formed of at least one of polymer, glass, quartz, and crystal silicon.

The optical waveguide 120 may be extended on the lower clad 110 in one direction. The optical waveguide 120 may have a different refractive index from the lower clad 110, first dielectric layer 130, and second dielectric layer 150. An optical signal may be transmitted through a medium with a high refractive index. For this reason, the optical waveguide 120 may have a higher refractive index than the lower clad 110, first dielectric layer 130, second dielectric layer 150.

The optical waveguide 120, first dielectric layer 130, and second dielectric layer 150 each may include at least one of polymer, oxide silicon, and nitride silicon. Among others, the first dielectric layer 130 and second dielectric layer 150 may include silica polymer whose refractive index changes an external electric field or heat. The first dielectric layer 130 may be arranged on the optical waveguide 120.

The graphene layer 140 may be arranged on the first dielectric layer 130. The graphene layer 140 may include thin film graphene. The graphene is a material in which carbon atoms are linked one another to form a thin planar structure in a honeycomb shape and has an electrical property. The carbon atoms are linked one another to form a carbon atomic layer. The graphene may be formed as single or multiple carbon atomic layers. At this point, single graphene layer 140 may have the same thickness as one carbon atom. The carbon atoms have a 6-membered ring as a basic unit and may be formed as a 5-membered ring or a 7-membered ring. The graphene layer 140 may be formed through a transferring method or a photolithographic process. The transferring method is a method of making an adhesive tape contact with a graphite source and transferring it to the optical waveguide 120 and the lower clad 110.

If light is provided the surface of the graphene layer 140, an electronic surface wave called surface plasmon may be generated. The surface plasmon means an oscillating wave of a charge density that is formed by the interaction of free electrons and light entering from the outside and travels along the interface between a material with free electrons and dielectric coming into contact with it The graphene layer 140 may transmit light in a TM (Transverse Magnetic) or TE (Transverse Electric) mode depending on the magnitude of its chemical potential. For example, if the chemical potential is greater than hw/2, the imaginary part of intraband contributing to the conductivity of the graphene layer 140 becomes greater than that of interband and the imaginary part of the entire conductivity of the graphene layer 140 becomes negative. At this point, the graphene layer 140 may guide light in a TM mode. In the opposite case, namely, if the chemical potential is smaller than hw/2, the graphene layer 140 may guide light in a TE mode.

If the graphene layer 140 approaches the optical waveguide 120 on the basis of this principle, light may travel from the optical waveguide 120 to the graphene layer 140. Light may have a TM mode. The light in the TM mode may be lost by the interaction with the charges (electrons or holes) of the graphene layer 140. If an external electric field is applied to the graphene layer 140, the density of charges (electrons or holes) in the graphene layer 140 may change. Then, the optical loss due to the interaction with the charges (electrons or holes) of the graphene layer 140 is changed. As the voltage increase, the loss may be decreases.

The second dielectric layer 150 may be arranged on the graphene layer 140. The electrode 160 may be arranged on the second dielectric layer 150. If a voltage is applied to between the graphene layer and electrode 160, the charge density of the graphene layer 140 may change. The light in the TM mode varies in level lost from the graphene layer 140 depending on the magnitude of the charge density. Such a variation in loss may induce the modulating effect of optical signal intensity at the output of the optical waveguide 120. Thus, the graphene photonic device 100 according to the first embodiment of the inventive concept may embody an optical modulator.

In addition, if an alternating voltage is applied to the graphene layer 140 and electrode 160, the refractive indices of the first dielectric layer 130 and second dielectric layer 150 may change. The change in refractive index may correspond to the change in combining efficiency of light in the TM or TE mode in the graphene layer 140. Light may be controlled to polarization in the TM mode or polarization in the TE mode by the variation in combining efficiency. Thus, the graphene photonic device 100 according to the first embodiment of the inventive concept may embody a polarization controller.

Figure 3:
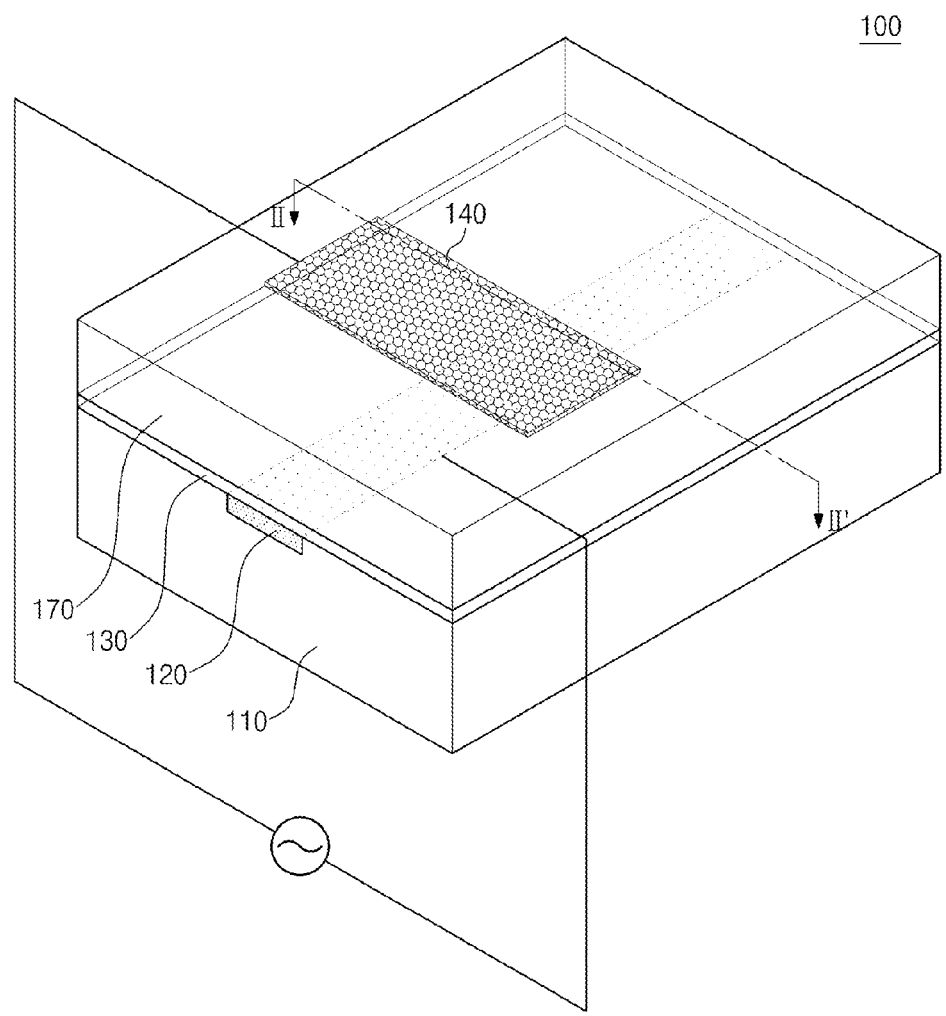
FIG. 3 is a perspective view representing a graphene photonic device according to a second embodiment of the inventive concept.
Figure 4:
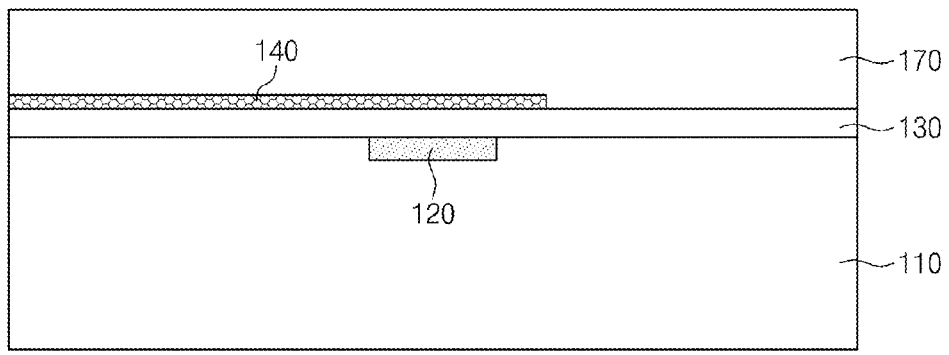
FIG. 4 is a cross sectional view taken along line II-II' of FIG. 3.

FIG. 3 is a perspective view representing a graphene photonic device 100 according to a second embodiment of the inventive concept. FIG. 4 is a cross sectional view taken along line II-II' of FIG. 3.

Referring to FIGS. 3 and 4, the graphene photonic device 100 according to the second embodiment of the inventive concept may include a lower clad 110, an optical waveguide 120, a first dielectric layer 130, a graphene layer 140, and an upper clad 170.

The lower clad 110 and upper clad 170 may be arranged below and over the optical waveguide 120. The lower clad 110 and the upper clad 170 may include polymer, glass, quartz, crystal silicon. The optical waveguide 120 may be extended on the lower clad 110 in a first direction. The first dielectric layer 130 may cover the optical waveguide 120. The first dielectric layer 130 changes in refractive index by the electric field induced between the optical waveguide 120 and graphene layer. The first dielectric layer 130 may include graphene oxide. The optical waveguide 120 may include a metallic-line optical waveguide. The metallic-line optical waveguide may include Au. The metallic-line optical waveguide may have a thickness of several tens to hundreds of nanometers and a line width of several tens of micrometers. The optical waveguide 120 may transmit incident light without loss. The optical transmission of the metallic-line optical waveguide may be described by using a long-range surface plasmon polariton (LR-SPP) theory.

A simple description of the optical waveguide principle of the metallic-line optical waveguide is as follows. An optical signal may be transmitted through free electron polarizations in the metallic-line optical waveguide and their mutual coupling. Successive coupling of such free electrons is referred to as surface plasmon polariton. Long-range optical transmission of the surface plasmon polariton is referred to as long-range surface plasmon polariton.

Surface plasmon (SP) may be the oscillating wave of a charge density that travels in a constrained state along an interface where the real terms of a dielectric constant have the opposite signs. Surface charge density oscillating may form a longitudinal surface constrained wave. For the longitudinal surface constrained wave, the electric field component of its incident wave is perpendicular to an interface and only a TM (Transverse Magnetic) mode may excite long-range surface plasmon polariton and guide waves. For example, the metallic-line optical waveguide may have a thickness of about 5 nm to 20 nm and a width of about 2 μm to 100 μm.

Figure 5A:
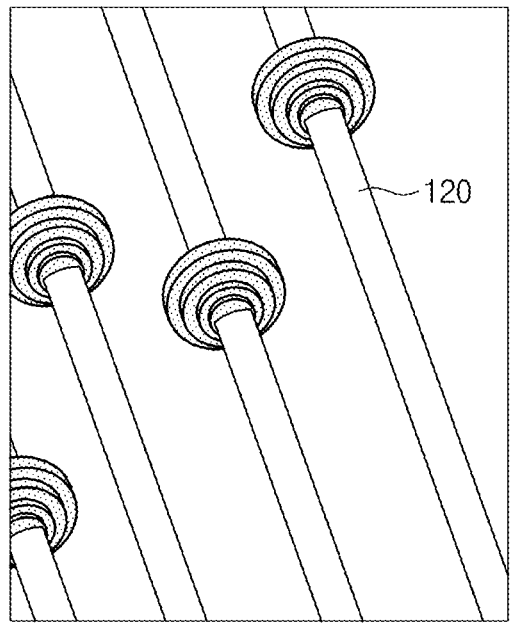
FIGS. 5A and 5B are views representing the correlation of the polarization of free electrons in an optical waveguide when transmitting optical signals.
Figure 5B:
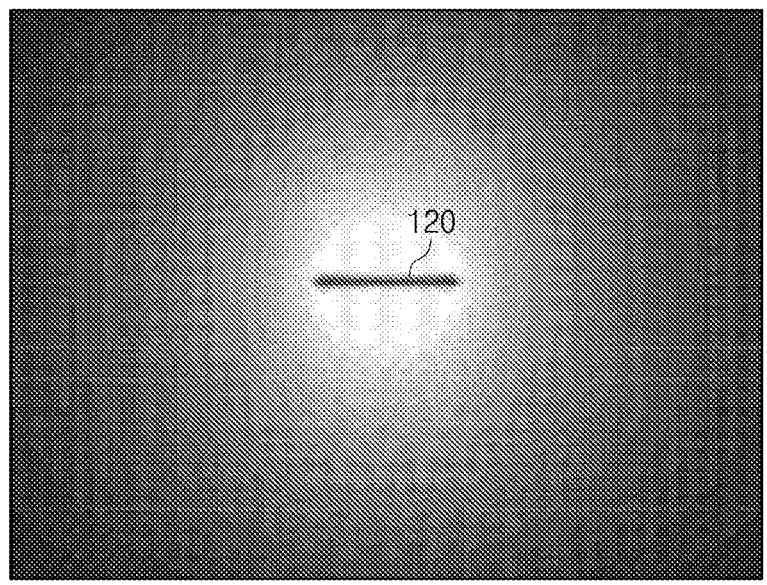

FIGS. 5A and 5B are views representing the flow of optical signals if an optical waveguide 120 is replaced with a metallic-line optical waveguide when transmitting the optical signals.

When a very thin narrow metallic line has been inserted into dielectric, the long-range surface plasmon polariton excited from the interface between metal and dielectric formed over and below the metallic line is combined each other to form a circular guide mode centered around the metallic line as in FIG. 5B. The formed guide mode guides waves along the metallic line as in FIG. 5A.

The graphene layer 140 may be arranged on the first dielectric layer 130. The graphene layer 140 may be extended in a second direction of interacting with the optical waveguide 120. If light enters the surface of the graphene layer 140, an electromagnetic surface wave called surface plasmon is created. The surface plasmon means an oscillating wave of a charge density that is formed by the interaction of free electrons and light entering from the outside and travels along the interface between a material with free electrons and dielectric coming into contact with it. If an alternating voltage is applied to the optical waveguide 120 and graphene layer 140, the charge density of the graphene layer 140 changes. An optical signal may be modulated depending on the magnitude of the charge density.

Thus, the graphene photonic device according to the second embodiment of the inventive concept may embody an optical modulator.

The inventive concept has been discussed on the basis of exemplary embodiments. Those skilled in the art to which the inventive concept pertains to will be able to understand that the inventive concept may be embodied in various forms without departing from the essential property of the inventive concept. Therefore, the embodiments disclosed should be considered in an explanatory view, not a limited view. The scope of the inventive concept is represented in the following claims not the description above and it should be construed that all the differences falling within their equivalent scope are included in the inventive concept.

What is claimed is:

1. A graphene photonic device comprising:
   a lower clad;
   an optical waveguide disposed on the lower clad and extending in a first direction;
   a first dielectric disposed on the optical waveguide;
   a graphene layer disposed on the first dielectric layer and extending in a second direction crossing the first direction;
   a second dielectric layer disposed on the graphene layer; and
   an electrode layer disposed on the second dielectric layer and extending in the second direction,
   wherein the first dielectric layer and the second dielectric layer comprise silica polymer whose refractive index changes by heat or an electric field.

2. The device of claim 1, wherein the optical waveguide has a higher refractive index than a substrate and the first dielectric layer.

3. The device of claim 1, wherein the optical waveguide comprises polymer, oxide silicon, or nitride silicon.

4. The device of claim 1, wherein the lower clad comprises polymer, a silicon oxide film, quartz, or silicon.

5. The device of claim 1, further comprising an alternating current (AC) voltage source connected to the graphene layer and the electrode layer.

6. A graphene photonic device comprising:
   a lower clad;
   an optical waveguide disposed on the lower clad and extending in a first direction;
   a first dielectric disposed on the optical waveguide;
   a graphene layer disposed on the first dielectric layer and extending in a second direction crossing the first direction;
   a second dielectric layer disposed on the graphene layer;
   an electrode layer disposed on the second dielectric layer and extending in the second direction; and
   an alternating current (AC) voltage source connected to the graphene layer and the electrode layer,
   wherein the graphene layer overlaps the optical waveguide, and the electrode layer overlaps the graphene layer and the optical waveguide, and
   wherein the first and second dielectric layers each have a refractive index that varies with an electric field induced using the graphene layer and the electrode layer.

* * * * *